(12) United States Patent
Hadjar et al.

(10) Patent No.: US 9,683,891 B2
(45) Date of Patent: Jun. 20, 2017

(54) COMPACT SPECTROMETER FOR TWO-DIMENSIONAL SAMPLING

(75) Inventors: Yassine Hadjar, Paris (FR); Sylvain Blaize, Troyes (FR); Aurelien Bruyant, Troyes (FR); Gilles Lerondel, Saint Julien les Villas (FR); Pascal Royer, Troyes (FR)

(73) Assignee: UNIVERSITE DE TECHNOLOGIE DE TROYES, Troyes (FR)

( * ) Notice: Subject to any disclaimer, the term of this patent is extended or adjusted under 35 U.S.C. 154(b) by 489 days.

(21) Appl. No.: 12/935,772

(22) PCT Filed: Mar. 17, 2009

(86) PCT No.: PCT/FR2009/000279
§ 371 (c)(1),
(2), (4) Date: Jan. 8, 2015

(87) PCT Pub. No.: WO2009/127794
PCT Pub. Date: Oct. 22, 2009

(65) Prior Publication Data
US 2015/0116720 A1    Apr. 30, 2015

(30) Foreign Application Priority Data
Mar. 31, 2008    (FR) .................... 08 01756

(51) Int. Cl.
*G01J 3/02*    (2006.01)
*G01J 3/28*    (2006.01)
(Continued)

(52) U.S. Cl.
CPC ............... *G01J 3/0205* (2013.01); *G01J 3/02* (2013.01); *G01J 3/021* (2013.01); *G01J 3/2803* (2013.01); *G01J 3/45* (2013.01); *G01J 3/453* (2013.01)

(58) Field of Classification Search
None
See application file for complete search history.

(56) References Cited

U.S. PATENT DOCUMENTS 5,777,736 A * 7/1998 Horton .................... G01J 3/453
356/456
2002/0075483 A1    6/2002 Harris, Jr. et al.
(Continued)

FOREIGN PATENT DOCUMENTS

EP    1 426 745 A1    6/2004
FR    2 889 587 A1    2/2007

OTHER PUBLICATIONS

Agladze, Nikolay I., and Albert J. Sievers. "Miniaturization of holographic Fourier-transform spectrometers." Applied optics 43.36 (2004): 6568-6579.*

*Primary Examiner* — Kara E Geisel
*Assistant Examiner* — Shawn Decenzo
(74) *Attorney, Agent, or Firm* — Patterson Thuente Pedersen, P.A.

(57) ABSTRACT

A spectrometer for sampling interferograms in two dimensions offering a large spectral band and high spectral resolution with a relative compactness. The spectrometer includes a refracting surface, an array of detecting elements and an array of diffusion elements capturing means at the refracting surface of an interferogram delivered from two interference beams (F1, F2) and forming interference lines parallel to each other along the transverse axis (Ox) of the interferogram within the plane (xOy) of the refracting surface, the array of detection elements being parallel to the plane of the refracting surface and arranged to detect the spatial distribution of the interferogram, wherein the array is a two-dimensional array over an entirety of which the detections elements are disposed equidistantly, and wherein (Continued)

interference lines exhibit an angular shift with the capturing means.

27 Claims, 12 Drawing Sheets

(51) Int. Cl.
  *G01J 3/453* (2006.01)
  *G01J 3/45* (2006.01)

(56) References Cited

U.S. PATENT DOCUMENTS

| | | | |
|---|---|---|---|
| 2004/0027579 A1* | 2/2004 | Lee | G01B 11/06 356/504 |
| 2007/0247620 A1* | 10/2007 | Koo | G01J 3/44 356/301 |
| 2008/0069497 A1* | 3/2008 | Tissot | G02B 6/29317 385/37 |
| 2008/0291426 A1* | 11/2008 | Azimi | G01J 3/02 356/51 |
| 2009/0219543 A1* | 9/2009 | Le Coarer | G01J 3/02 356/451 |

* cited by examiner

COMPACT SPECTROMETER FOR TWO-DIMENSIONAL SAMPLING

PRIORITY CLAIM

The present application is a National Phase entry of PCT Application No. PCT/FR2009/000279, filed Mar. 17, 2009, which claims priority from French Application No. 08/01756, filed Mar. 31, 2008, the disclosures of which are hereby incorporated by reference herein in their entirety.

TECHNICAL FIELD

The invention relates to the field of Fourier transform spectrometers. More particularly, the invention relates to a spectrometer containing a refracting surface, means for capturing, at said refracting surface, an interferogram delivered from two interference beams and forming interference lines along the transverse axis of the interferogram within the plane of the refracting surface, said capturing means comprising an array of detection elements arranged to detect the spatial distribution of said interferogram.

BACKGROUND

Several types of spectroscopic detectors are known, such as the Fourier transform type.

A two-dimensional spectrometer in integrated optics is known from patent application FR 2,889,587. In this application, the two interference beams are two counter-propagating waves introduced in a waveguide. Sampling tools in the form of for example nanostuds positioned along the waveguide allow for a spatial sampling of the evanescent waves delivered from this interference field. The detector is mono-dimensional and enables the capturing of the interference lines of the interferogram along their entire width, which makes the control of the detector's resolution possible.

The disadvantage of the described solution in this application lies in the limitation of the spectral band of the detector's analysis. This limitation is due to the distance between the nanostuds which cannot go lower than a certain value. In fact, below this value, problems of light scattering prevent getting satisfactory measures by spectrometer. Thus, the described system does not enable piecing together of the whole spectrum, by means of inverse Fourier transform, as the interferogram is sub-sampled, by loss of high frequency components.

Besides, a complementary solution to the one described above consists in using an optical element, such as a projection lens, in order to increase the interferogram size— and consequently of the interference lines—at the detector. For this, the interferogram is projected on a screen by conjugation with the lens. This way it is possible to adjust the resolution via the lens expansion, to sub-sample the interferogram. Consequently, the limitation of the spectral band by the effects of light scattering is reduced.

However, this solution requires placing a lens between the detector and the refracting surface and to move the detector away significantly. As a result, such a spectrometer is extremely voluminous.

Finally, compact spectroscopic detectors are known from the US patent application 2002/0075483. In this application, standing waves are sampled by an ultra-thin detector composed of a vibrating membrane. A mirror placed downstream from the detector reflects the light from a light beam having crossed through the detector so that it superimposes with the one from the same light beam and reaching this detector. The interferogram is then located in the central plane of the membrane. The latter vibrates so as to scan at least one part of the interferogram, which enables to increase the spectral resolution.

A disadvantage of this solution lies however in the limitation of the amplitude of the membrane vibration. This limitation is due to the necessary curvature of the membrane beyond a certain vibration amplitude, thus distorting the spectral measure significantly. Yet, since it is the vibration amplitude that determines the resolution, it appears that such a spectrometer is limited in spectral resolution.

Still other solutions exist to produce a compact spectroscopic detector, particularly Bragg's array dispersion detectors or stationary and dynamic Michelson's interferometers. However, these detectors do not obtain a high resolution without being necessarily limited in terms of analysis spectral band or being voluminous.

Thus all the solutions of the state of the art require a necessary compromise between, on the one hand, the spectral resolution and, on the other hand, the analysis spectral band and the consistency.

SUMMARY

Embodiments aim to remedy disadvantages of the detectors according to the state of the art by offering a compact spectrometer with large spectral band and high spectral resolution. Embodiments target to this end the deletion of a compromise between the spectral band and the spectral resolution, while ensuring a certain consistency of the spectrometer.

For this, embodiments propose that the array of detection elements should be two-dimensional, and that at least one portion of said capturing means and interferogram be tilted with respect to each other along the interferogram transverse axis.

This tilting can be obtained in two different ways in embodiments: either by physically tilting one part of the capturing means with respect to the refracting surface plane, or by tilting the interferogram via two-dimensional phase lag means. A combination of these two proceeding manners may also be considered.

It is known that an interferogram from two contra propagative beams of incidence causes a body of interference lines parallel to each other. Besides, this interferogram is invariant according to the lines' axis. The tilting of the interferogram with respect to at least one portion of the capturing means enables to shift several lines of the detectors' array, with respect to the interference lines of the interferogram, while keeping the distance between each detection element. In these conditions, each shifted line provides complementary information to those obtained by the other lines. The sampling interval is thus no longer the distance between the detection elements, but the offset of these elements from one line to another, and therefore it is possible to over-sample in order to obtain a high spectral resolution while having a broader spectral band.

In an embodiment aiming at tilting the interferogram with regard to the refracting surface plane, the spectrometer includes at least a two-dimensional phase lag means arranged so as to delay the phase of one of the two interference beams in order to tilt the interferogram with respect to the refracting surface plane following the interferogram transverse axis. Thus the interferogram is tilted with respect to at least a portion of the capturing means, which provides advantages.

In an embodiment aiming at adjusting the position of the interferogram at the refracting surface level, the spectrometer includes at least a mono-dimensional phase lag means arranged to delay the phase of one of the two interference beams so as to move the center position of the interferogram along the transverse axis of the interferogram.

In order to obtain at the output of the spectrometer the discrimination of the light spectrum whereof result the two interference beams, the spectrometer comprises calculating means, at least partly related to the two-dimensional array of the detection elements for the processing of the experimental data measured by at least one portion of the detection elements and the reconstitution of the spectral distribution of at least one of the two interference beams.

According to one embodiment, each detection element is a transducer element. A transducer element can be a pixel, of a CCD or CMOS detector for example.

Two types of configuration are possible according to the angle of incidence of the two incidence beams. In the first configuration, called "dark field," the angle of incidence of each of the two interference beams on the refracting surface plane is smaller than the total reflection critical angle. In the second configuration, called "evanescent waves," the angle of incidence of each of the two interference beams on the refracting surface plane is larger than the total reflection critical angle.

When the angle of incidence of each of the interference beams on the refracting surface plane is smaller than the total reflection critical angle, that is to say, in the configuration called "dark field," the two-dimensional array of the detection elements is tilted with regard to the interferogram according the transverse axis of the interferogram. The interferogram is thus arranged on the two-dimensional detection array and the tilting enables to produce an over-sampling so that the resolution is smaller than the quarter of the interfringe of the interferogram.

According to a first embodiment of the "dark field" configuration, the two-dimensional array of detection elements is tilted with regard to the refracting surface plane on the transverse axis of the interferogram. In this case, it is the tilting of the two-dimensional array of the detection elements that allows the shifting of the lines of the detection elements with respect to the interferogram. It is also possible in this embodiment to add to the spectrometer a two-dimensional phase lag means arranged so as to delay the phase of one of the two interference beams in order to tilt the interferogram with respect to the refracting surface plane along the transverse axis of the interferogram, provided that the tilting caused by this two-dimensional means of delay is different from that of the two-dimensional array of the detection elements.

According to a second embodiment of the "dark field" configuration, the two-dimensional array of the detection elements is parallel to the refracting surface plane and the spectrometer comprises at least two-dimensional phase lag means arranged so as to delay the phase of one of the two interference beams to tilt the interferogram with respect to the refracting surface plane according the transverse axis of the interferogram.

In each of these embodiments in a "dark field" configuration, two types of configurations are possible. In the first configuration, the two-dimensional array of the detection elements is very close to the refracting surface such that it is placed in the area illuminated by the two interference beams. The two-dimensional array of the detection elements thus receives light directly from the two interference beams. In this configuration, the capturing means also include an index gel arranged between said two-dimensional array of the detection elements and said refracting surface, and in contact with said array and said refracting surface so as to reduce the multiple reflections between said array and said refracting surface.

In the second configuration, the two-dimensional array of the detection elements is remote from the refracting surface so as to be located in dark area non illuminated by the two interference beams. Thus, the two-dimensional array of the detection elements does not receive the light from the two interference beams. In this configuration, the capturing means also include a two-dimensional array of diffusion elements arranged to project the interferogram onto the two-dimensional array of detection elements by diffusing propagative waves.

When the angle of incidence of each of the two interference beams on the refracting surface plane is larger than the total reflection critical angle, such as in a configuration called "evanescent waves," the capturing means also include a two-dimensional array diffusion arranged to project the interferogram onto the two-dimensional array of the detection elements by scattering evanescent waves, the said two-dimensional array of the diffusion elements being tilted with respect to the interferogram along the transverse axis of the interferogram. It is thus possible to arrange the interferogram on the two-dimensional array of the detection elements via the two-dimensional diffusion elements located between the two-dimensional array of detection elements and the refracting surface. This allows therefore achieving an over-sampling so that the resolution is smaller than the quarter of the interferogram fringe.

According to a first embodiment of the configuration "evanescent waves," the two-dimensional array of diffusion elements is tilted with regard to the refracting surface plane along the transverse axis of the interferogram. In this case, it is the tilting of the two-dimensional array of the diffusion elements that allows the shifting of the lines of the detection elements with respect to the interferogram. It is also possible in this embodiment to add to the spectrometer a two-dimensional phase lag means arranged so as to delay the phase of one of the two interference beams in order to tilt the interferogram with respect to the refracting surface plane along the transversal axis of the interferogram, provided that the tilting caused by this two-dimensional delay means is different than that of the two-dimensional array of diffusion elements.

According to a second embodiment of the configuration "evanescent waves," the two-dimensional array of the diffusion elements is parallel to the refracting surface plane and the spectrometer includes at least one two-dimensional phase lag means arranged so as to delay the phase of one of the two interference beams in order to tilt the interferogram with respect to the refracting surface plane along the transverse axis of the interferogram.

In each of these embodiments of the configuration "evanescent waves," it is possible to provide that the two-dimensional array of the detection elements is tilted with respect to the two-dimensional array of the diffusion elements along the transverse axis of the interferogram.

In embodiments of these forms of the configuration "evanescent waves," it is also possible to provide that the two-dimensional array of the detection elements is parallel to the two-dimensional of the diffusion elements.

Advantageously, each detection element is superimposed on a diffusion element by projection along the orthogonal axis of the refracting surface plane. Such a centered configuration of detection and diffusion elements allows to accurately measure the projection of the interferogram on each detection element with no delay to be corrected.

Advantageously, the width of at least some of the diffusion elements is much smaller than the quarter of the interfringe of the interferogram. Thus the minimum resolution, given by the Shannon criteria as being a quarter of the interfringe of the interferogram, is not limited by the width of the diffusing elements.

According to one embodiment, at least one scattering element is a rod of a length equal to that of the detection element.

According to another embodiment, at least one scattering element is a scattering stud.

According to another embodiment, at least one scattering element is a scattering point.

According to an embodiment of the spectrometer, an isosceles prism is included and arranged so that the refracting surface comprises at least one portion of the back surfaces of the prism, and that the interference beams reach the front surface of the prism at normal incidence symmetrically to the median plane of said front surface that cuts the edge formed by the intersection of the two back surfaces of said prism. It is thus possible to produce a very compact spectrometer wherein the tilting of the interferogram with respect to the two-dimensional array of the detection elements allows the control of the spectral resolution and the analysis spectral band.

In an embodiment aiming to adjust the position of the interferogram at the refracting surface level, the spectrometer includes at least one mono-dimensional phase lag means arranged to delay the phase of one of the two interference arrays so as to move the centre position of the interferogram along the transversal axis of the interferogram. Among these mono-dimensional phase lag means at least one is arranged against one of the two front half-faces being formed by the intersection of the front surface with the median plane of the said front surface that cuts the edge formed by the intersection of the two back surfaces of said prism.

In an embodiment aiming to tilt the interferogram with respect to the refracting surface plane, the spectrometer includes at least one two-dimensional phase lag means arranged so as to delay the phase of one of two interference beams in order to tilt the interferogram with respect to the refracting surface plane along the transverse axis of the interferogram. Among these two-dimensional phase lag means, it can be provided that at least one is arranged against one of the two front half-surfaces of the front isosceles prism, each half-surface being formed by the intersection of the front surface with the median plane of said front surface that cuts the edge formed by the intersection of the two back surfaces of said prism. It can be also provided that at least one is arranged against one of the two back surfaces of the isosceles prism.

According to another embodiment of the spectrometer, a means of transduction is included and an isosceles prism arranged so that the refracting surface is constituted by at least one part of a back surface, so that an interference beam reaches said means of transduction placed against said refracting surface in normal incidence after traversing the other back surface then being reflected on the front surface, and that the other interference beam directly arrives said refracting surface, on which it is reflected because of the presence of the means of transduction.

In all these embodiments using an isosceles prism, it can be advantageously provided that this prism is an isosceles rectangular prism.

The invention also proposes a spectroscopic imaging device comprising means for the emission of two interference beams and a spectrometer according to any one of the above embodiments.

In one embodiment of this device, the emission means include a light source emitting a light beam, a means of separating the light beam into two interference beams, and means of guidance and collimation of these two interference beams towards the refracting surface so as to locate the interferogram issued from two interference beams at the plane of said refracting surface.

BRIEF DESCRIPTION OF THE DRAWINGS

The invention will be better understood when reading the detailed description of a non-limitative example of the embodiment, with reference to the accompanying drawings.

DETAILED DESCRIPTION

Figure 1:
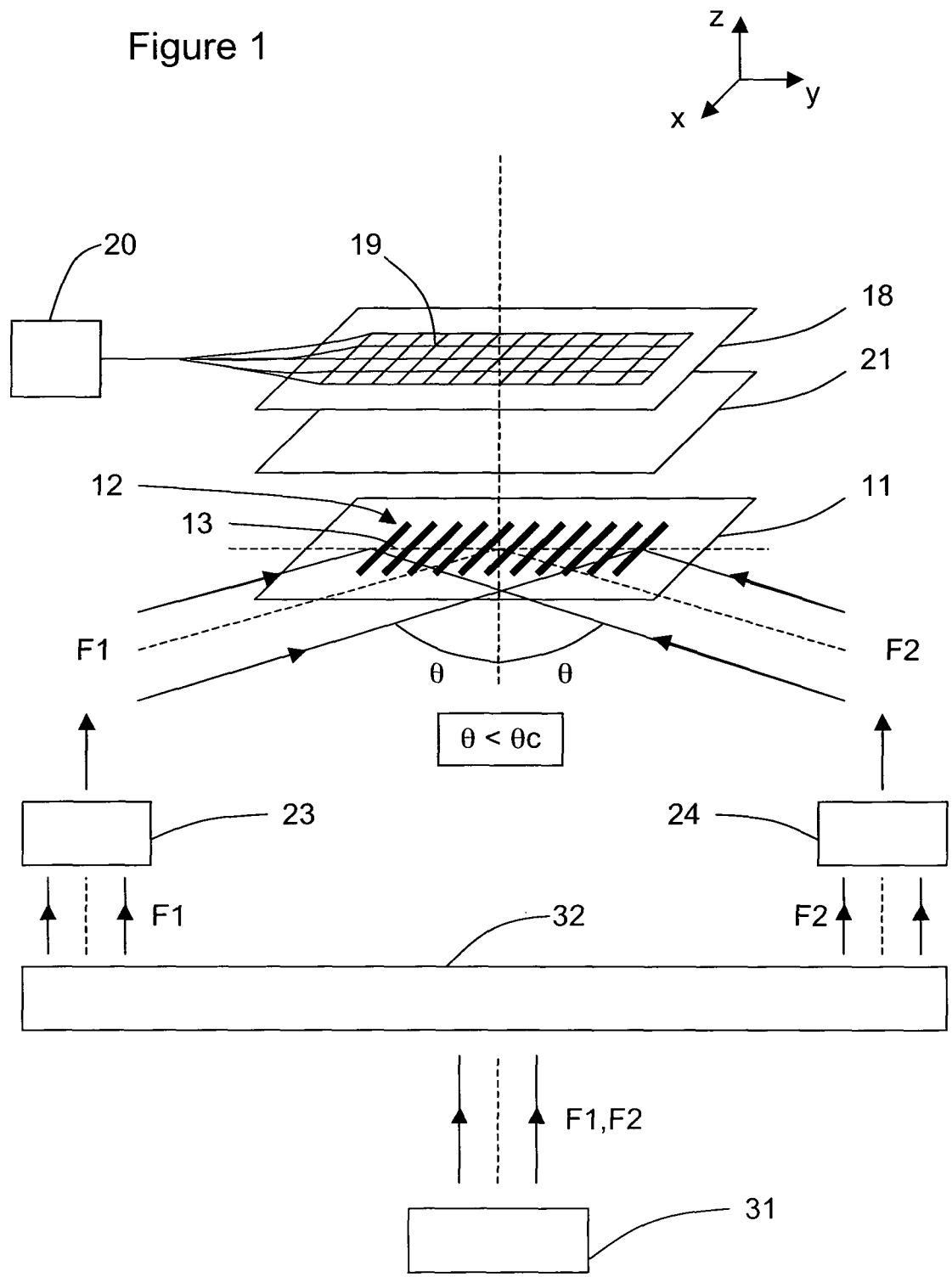
FIG. 1 is a schematic diagram of a spectrometer according to a first embodiment in a "dark field" configuration.

FIG. 1 represents a schematic diagram of a spectrometer according to a first embodiment in a "dark field" configuration.

The spectrometer in this configuration includes a refracting surface 11, capturing means 18, and calculation means 20.

The spectrometer enables the measurement of the spectral distribution of a light source separated beforehand in two interference light beams F1 and F2, these two beams being collimated, shaped and projected onto the refracting surface to form a system of interferences, or interferogram.

The refracting surface 11 is a transparent plane located on the plane (xOy) and separating two half-planes of different indexes of refraction. It is arranged so as to locate in its plane the interferogram 12 issued from the two interference beams F1 and F2. The two beams F1 and F2 reach the refracting surface 11 by making an angle θ with the transversal axis (Oz) of the refracting surface 11. They form interferences' field 12 (or interferogram) comprising interference lines 13 along the transverse direction (Ox) of the interferogram belonging to the (xOy) refracting surface plane 11. These lines 13 correspond to a sequence of dark and bright fringes.

The capturing means 18 include a two-dimensional array 18 of detection elements 19 located in a parallel plan to the refracting surface plane 11. The detection elements 19 are arranged in an equidistant manner on the entire two-dimensional array 18. The detection elements 19 are photosensitive transducer elements capable of detecting a part of the interferogram.

The calculating means 20 are connected to the two-dimensional array 18. More precisely, each detection element 19 of the array 18 is linked to said means of calculating 20. These means of calculating achieve the experimental data processing measured by each detection element 19 and the reconstitution of the spectral distribution of at least one of the two interference beams (F1,F2), or of the light source producing these two beams (F1,F2). For this, the electrical signals obtained by the array 18 are digitally filtered and processed to reconstruct, by inverse transform's Fourier, said spectral distribution.

According to one embodiment, phase lag means 23 can be arranged so as to be traversed by one of the two interference beams. This phase lag means 23 is a phase lag line. It is traversed by beam F1 and introduces for this beam the same phase shift whatever the incidence plane (yOz) wherever we are, the phase shift being thus independent of the transverse component (Ox). This line 23 thus provides for moving and controlling the position of the central brilliant fringe along the axis (Oy).

We define the critical angle θc as the angle beyond which we obtain an internal total reflection of the beams at the refracting surface 11. For example, for a refracting surface separating a median of index n=1.5 (halfspace inferior) of air index 1 (halfspace superior), this angle θc is worth 45°. In this particular case where the incidence angle θ is smaller than this critical angle θc, the beams of incidence F1, F2 traverse the refracting surface 11 and reach the two-dimensional array 18 of detection elements 19. We speak of "dark field."

According to this first embodiment in dark field, the two-dimensional array 18 is not tilted with regard to the plane (xOy) of refracting surface 11. A two-dimensional phase lag means 24 is arranged so as to be traversed by the other interference beam. This phase lag means 24 is a two-dimensional phase lag line. It is traversed by the beam F2 and introduces a different phase shift depending on the transversal direction (Ox), this phase shift can be incremental or linear. The beam F2 traversing the phase lag line 24 thus presents a transverse distribution of its controlled phase by the structure of line 24. The means 24 can be for example a transparent element of gradient index or tilted mirror. In both cases, it allows for a difference of functioning that increases in a linear way or in stages according to the direction (Ox).

The light beam F2 traversing line 24 and fused to beam F1 allows obtaining a system of bright and dark interference lines tilted at an angle α with regard to axis (Ox).

In this embodiment, the two-dimensional beam 18 of detection elements 19 is situated at a really near distance to the refracting surface 11 so as to be located in the zone lighted by the two interference beams. Thus, the capturing means also include an index gel 21 located between the two-dimensional array of detection elements 19 and the refracting surface, and in contact with them. This makes it possible to avoid the multiple reflections between the array 18 and the refracting surface, that could cause stray lights distorting the measure on the interferogram 12.

In another embodiment, the two-dimensional array 18 of detection elements 19 is distant from far the refracting surface 11 so as to be located in a dark area not lighted by the interference beams. Thus, the capturing means include also a two-dimensional array of diffused elements arranged to project the interferogram 12 on the two-dimensional array 18 of detection elements 19 by diffusing propagative waves.

Figure 2:
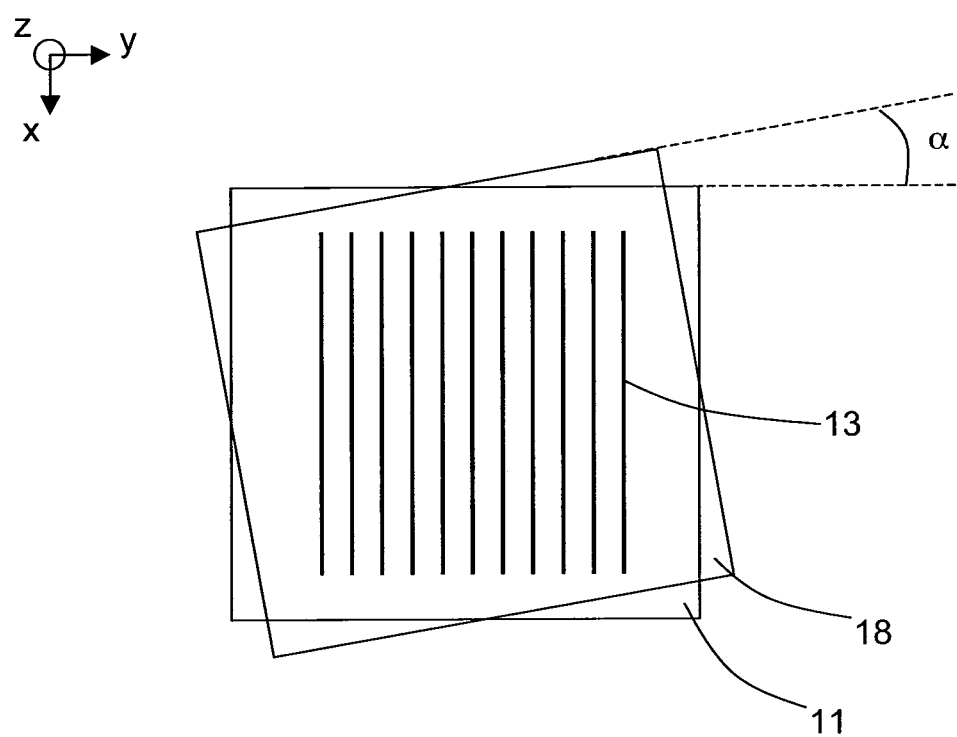
FIG. 2 is a top view of the spectrometer illustrating a second embodiment in a "dark field" configuration.

FIG. 2 represents a top view of the spectrometer illustrating a second embodiment in the "dark field" configuration.

The spectrometer according to this embodiment does not contain phase lag means 24. The two-dimensional array 18 of detection elements 19 is tilted at an a angle with respect to the refracting surface plane (xOy) 11 along the transverse axis (Ox) of the interferogram 12. The array 18 is thus tilted with regard to interference lines 13. In this case, the phase lag means 24 is rendered useless because it is not necessary to tilt the interference lines.

In these conditions, the obtained result at the level of the detection is thus the same as the one provided by the spectrometer according to the first embodiment and illustrated by the first embodiment and illustrated by FIG. 1. In fact, it is equivalent to tilt the interference lines 13 of an angle α and to maintain the array 18 parallel to the transverse axis (Ox) of the interferogram 12, or to tilt the array 18 of an angle α and to maintain the interference lines 13 parallel to the transverse axis (Ox) of the interferogram 12.

Figure 3:
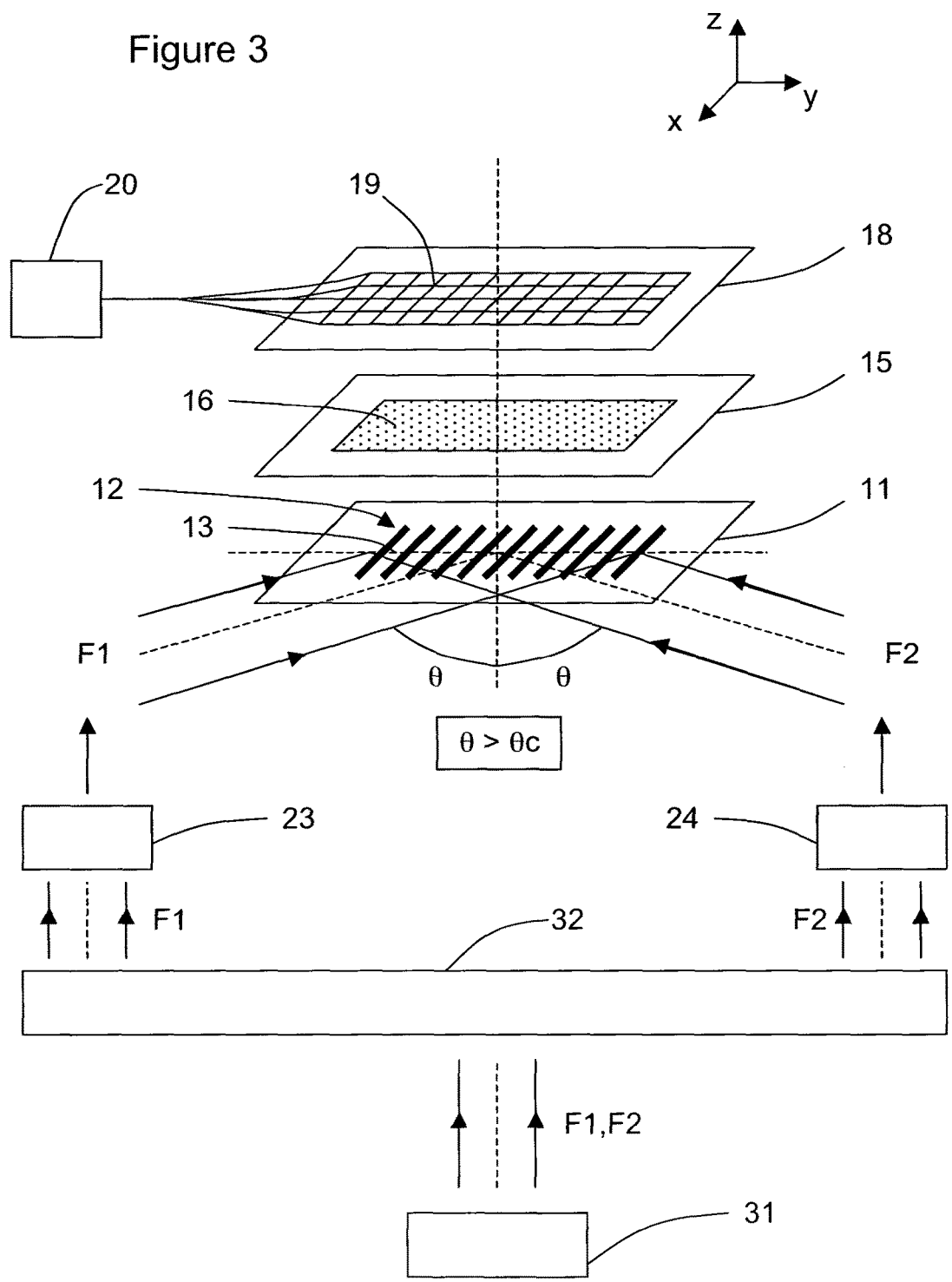
FIG. 3 is a schematic diagram of a spectrometer according to a first embodiment in an "evanescent waves" configuration.

FIG. 3 represents a schematic diagram of a spectrometer of a first embodiment in an "evanescent waves" configuration.

The spectrometer in this configuration also contains a refracting surface 11, capturing means 18, and means of calculation 20.

In this particular case where the angle of incidence θ is higher than this critical angle θc, the beams of incidence F1, F2 are completely reflected onto the refracting surface 11 and an evanescent wave is formed on the side of the surface of weak index (upper half-space). We then talk of the "evanescent waves" configuration.

The capturing means 18 include a two-dimensional array 18 of detection elements 19 and a two-dimensional array 15 of diffusion elements 16. These two arrays are located on the plane parallel to the refracting surface plane 11.

The two-dimensional array 15 of diffusion elements 16 is located on a plane parallel to the refracting surface plane 11, above the plane of the said refracting surface 11 and in contact with the evanescent wave. The diffusion elements 16 are arranged equidistantly on the entire two-dimensional array 15.

The detection means include a two-dimensional array 18 of detection elements 19 also located on a plane parallel to the refracting surface plane 11, above the plane of the two-dimensional array 15 of diffusion elements 16. The detection elements 19 are arranged equidistantly on the entire two-dimensional array 18.

Advantageously, each diffusion element 16 is associated with a detection element 19. The projection of a diffusion element 16 onto the plane of the two-dimensional array 18 of detection elements 19 is merged with the detection element 19 associated to said diffusion element 16. In such a configuration, each diffusion element 16 is perfectly centered below a detector 19. The array 15 of diffusion elements 16 and the array 18 of detectors 19 coincide.

Advantageously, a means of phase lag 23 can be arranged identically to that in the first embodiment in dark field illustrated by FIG. 1.

In this configuration, the angle of incidence θ of the interference beams F1, F2 is higher than the total reflection critical angle θc. Evanescent waves are thus produced and localized on the surface on the weak incidence side of the refracting surface 11. In these conditions, no beam can be propagated beyond the refracting surface 11. The distribution of intensity at the evanescent wave exactly reflects that of the interferogram produced by the internal total reflection of the beams F1 and F2. The sampled signal of this distribution of intensity on the refracting surface 11 is obtained by merging the array 15 of diffusing elements 16 and the array 18 of detection elements 19.

The shape and the height of the diffusing elements 16 can be chosen in order to optimize the efficiency of the demapping of the evanescent wave towards the detectors 19, using the maximum of useful surface of the detector 19 associated to this diffusion element 16. An example of shape can be bars whereof the width would be highly inferior to the quarter of the interfringe and of a length along a fringe would be the same as that of the detector. In case of saturation of detectors, we can then reduce the length of the bars until the points or blips are obtained.

According to this embodiment in the "evanescent waves" configuration, a two-dimensional phase lag means 24 is arranged so as to be traversed by the other beam of interference. This phase lag means 24 is a two-dimensional phase lag line. It is traversed by the beam F2 and introduces a different phase shift depending on the transversal direction (Ox), this phase shift can be incremental or linear. The beam F2 traversing the phase lag line 24 thus exhibits a transverse distribution of its controlled phase by the structure of the line 24. The means 24 can be for example a gradient index transparent element or a tilted mirror. In both cases, it can produce a functioning difference that increases linearly or in steps according to the direction (Ox). The light beam F2 crossing line 24 and merged to beam F1 can obtain a system of bright and dark interference lines tilted at an angle α with regard to axis (Ox).

Figure 4:
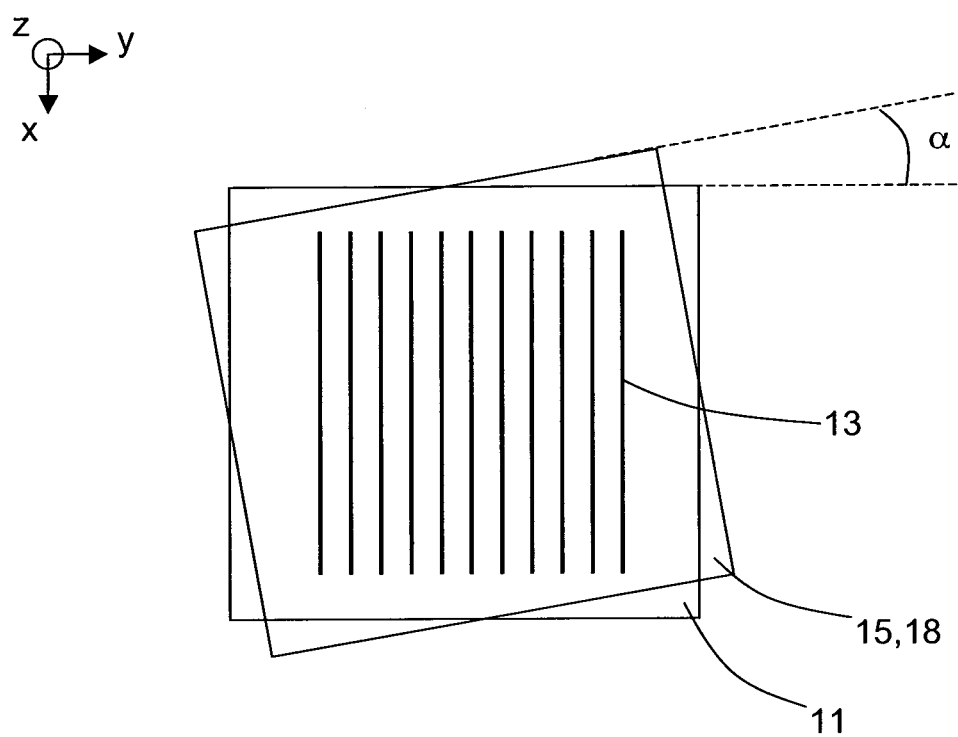
FIG. 4 is a top view of the spectrometer illustrating a second embodiment in the "evanescent waves" configuration.

FIG. 4 represents a top view of the spectrometer illustrating a second embodiment in the "evanescent waves" configuration.

According to this second embodiment, the two-dimensional arrays 15 and 18 of diffusion elements 16 and of detection 19 are tilted at an angle α with regard to axis (Ox) of the refracting surface plane 11. The diffusion elements 16 and detection 19 are perfectly aligned in an embodiment. In this embodiment, said "centered configuration," the two arrays 15 and 18 are thus tilted with regard to the interference lines 13. In this case, the phase lag means 24 is rendered useless because it is not necessary to tilt the interference lines. In these conditions, the result obtained at the detection is hence the same as the one provided by the spectrometer according to the first embodiment in "evanescent waves" configuration In fact, it is equivalent to tilt the transverse axis 13 at an angle α and to maintain the arrays 15 and 18 parallel to the transverse axis (Ox) of refracting surface 11, or to tilt the arrays 15 and 18 at an angle α and to maintain the interference lines 13 parallel to the transverse axis (Ox) of the refracting surface 11.

Figure 5:
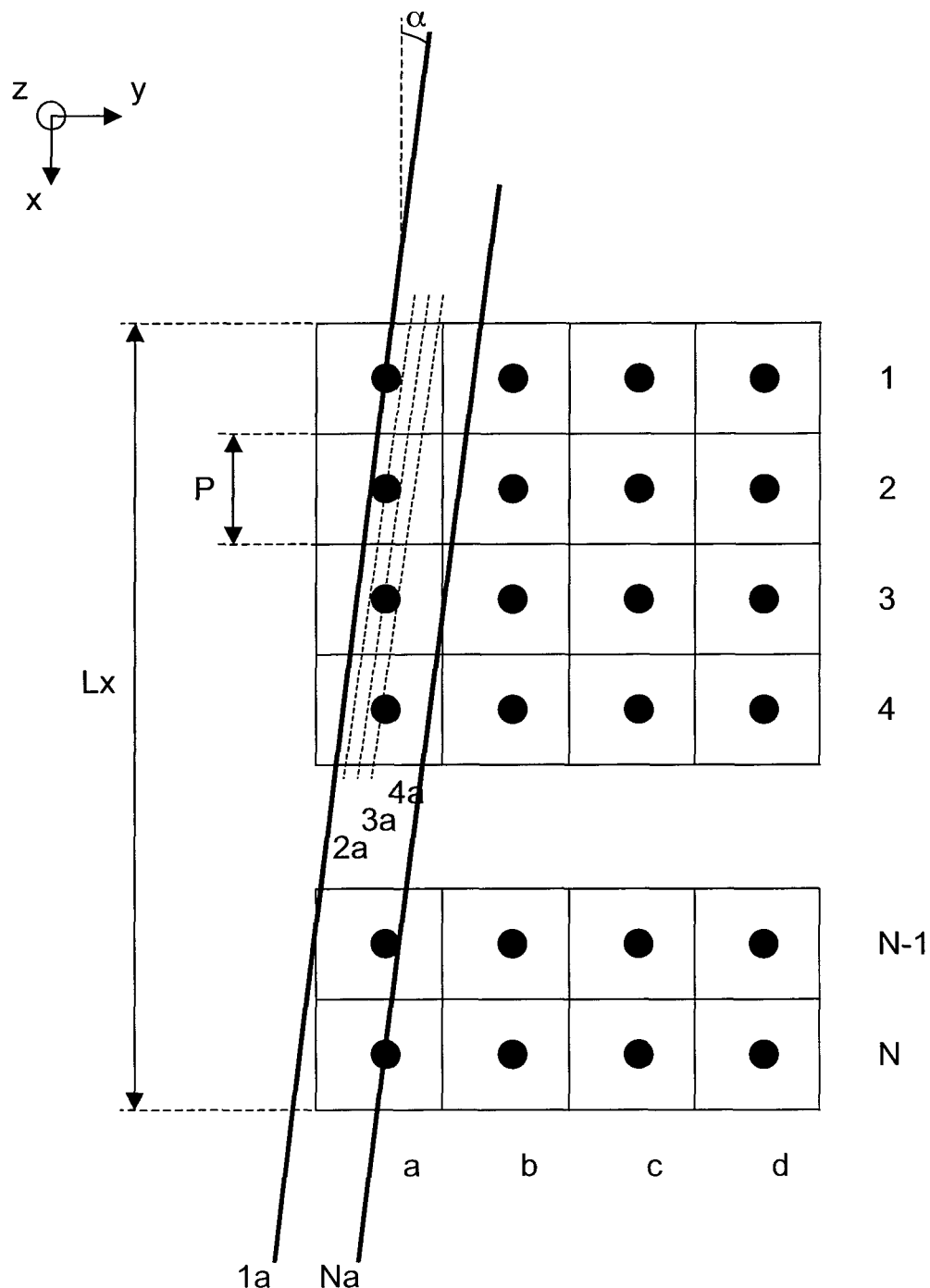
FIG. 5 is a top view of the spectrometer according to the first and the second embodiments in an "evanescent waves" configuration.

FIG. 5 represents a top view of the spectrometer according to the first and the second embodiments in the "evanescent waves" configuration.

As illustrated in FIG. 5, it is possible to produce an oversampling "r" so as r is smaller than the quarter of the interfringe, while keeping a distance between the columns of the diffusion elements 16 parallel to the axis (Ox) that is equal to the size P of pixels ("pixel pitch"). More precisely, P refers to the period of the detector array and approaches the size of the pixel when the spacing between pixels is low. In this particular embodiment where the interferogram is not periodic, the minimal interfringe will be taken into consideration to define the maximal resolution of the sampling which corresponds to the minimal sampling step$_{Min}$.

Figure 6:
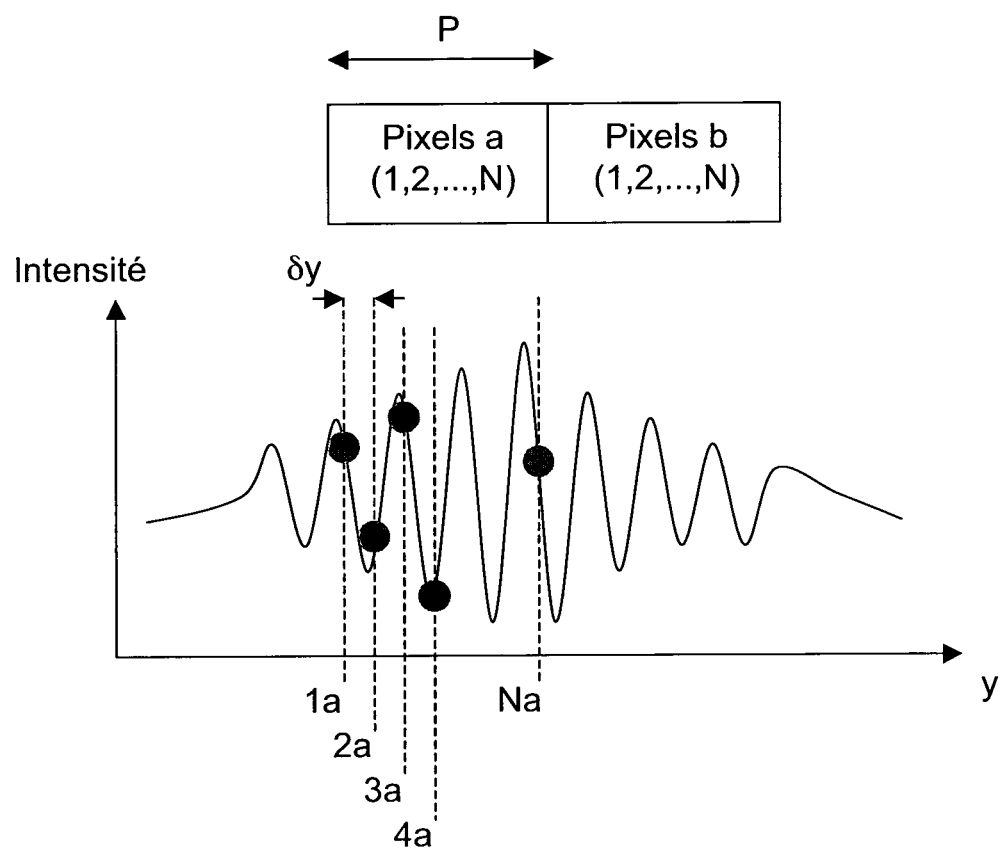
FIG. 6 is a graph of the distribution of intensity measured by the spectrometer according to the first and second embodiments in the "evanescent waves" configuration.

FIG. 6 is a diagram of the intensity distribution measured by the spectrometer according to these first and second embodiments in the "evanescent waves" configuration.

As illustrated in FIGS. 5 and 6, the detectors 19 located in column "a" and lines 1 to N provide a sampling of the intensity distribution along this column "a." The points "1a" to "Na" give the intensity of the interference field to the corresponding points of array 18. The maximal resolution of this transversal sampling depend on the tilting angle α between the interference lines 13 and the array columns 15 and 18, as well as of the size P of the pixels. The Shannon criterion imposes that the minimum sampling step $r_{Min}$ be less or equal to the quarter of the minimal interfringe of the interferogram 12.

The resolution in wave length of the spectrometer is linked to the longitudinal component on the plane of incidence and involves a condition on the width of the beams projected on the plane of incidence (yOz). Its spectral band of analysis is linked to the transversal component (perpendicular to the plane of incidence) and involves a condition on the transverse size of the beams according to the axis (Ox). The performances also depend on the precision with which the tilting of the interference beams 13 with regard to arrays 15 and 18 is realized and controlled. As a result, a spectrometer in accordance with this embodiment exhibits the advantage of having a resolution and a spectral band of analysis that do not depend on the pixels size.

The reasoning illustrated by FIGS. 5 and 6 is also applicable to the two embodiments of the invention in the "dark field" configuration illustrated by FIGS. 1 and 2.

Figure 7:
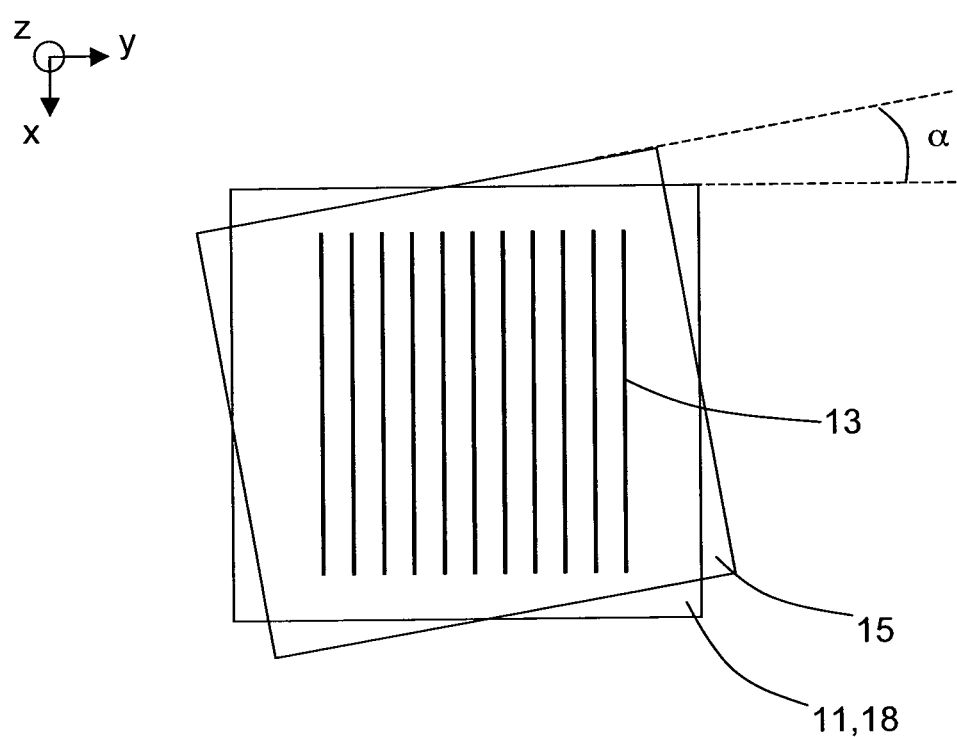
FIG. 7 is a top view of the spectrometer illustrating a third embodiment in the "evanescent waves" configuration.

FIG. 7 represents a top view of the spectrometer illustrating a second embodiment of the invention in the "evanescent waves" configuration.

According to the third embodiment, the two-dimensional array 15 of diffusion elements is tilted at an angle α with regard to the axis (Ox) of the refracting surface plane 11. The two-dimensional array 18 of detection elements 19 is parallel to the refracting surface plane 11. The elements of diffusion 16 and detection 19 are tilted at an angle α along the axis (Ox) of the refracting surface plane 11. In this embodiment, said "decentered configuration", only the array 15 is tilted with regard to the lines of interference 13. By tilting the columns of the diffusion elements 16 with regard to the axis (Ox), the diffuser arrays 16 and the captors 19 are no longer superimposed. This tilting at a predetermined angle α can be obtained by a production process of grid surfaces by a two-beam holography. This type of process enables to register the diffusers 16 at the surface of the refracting surface 11 with an excellent control of the tilting angle α on all the columns.

Figure 8:
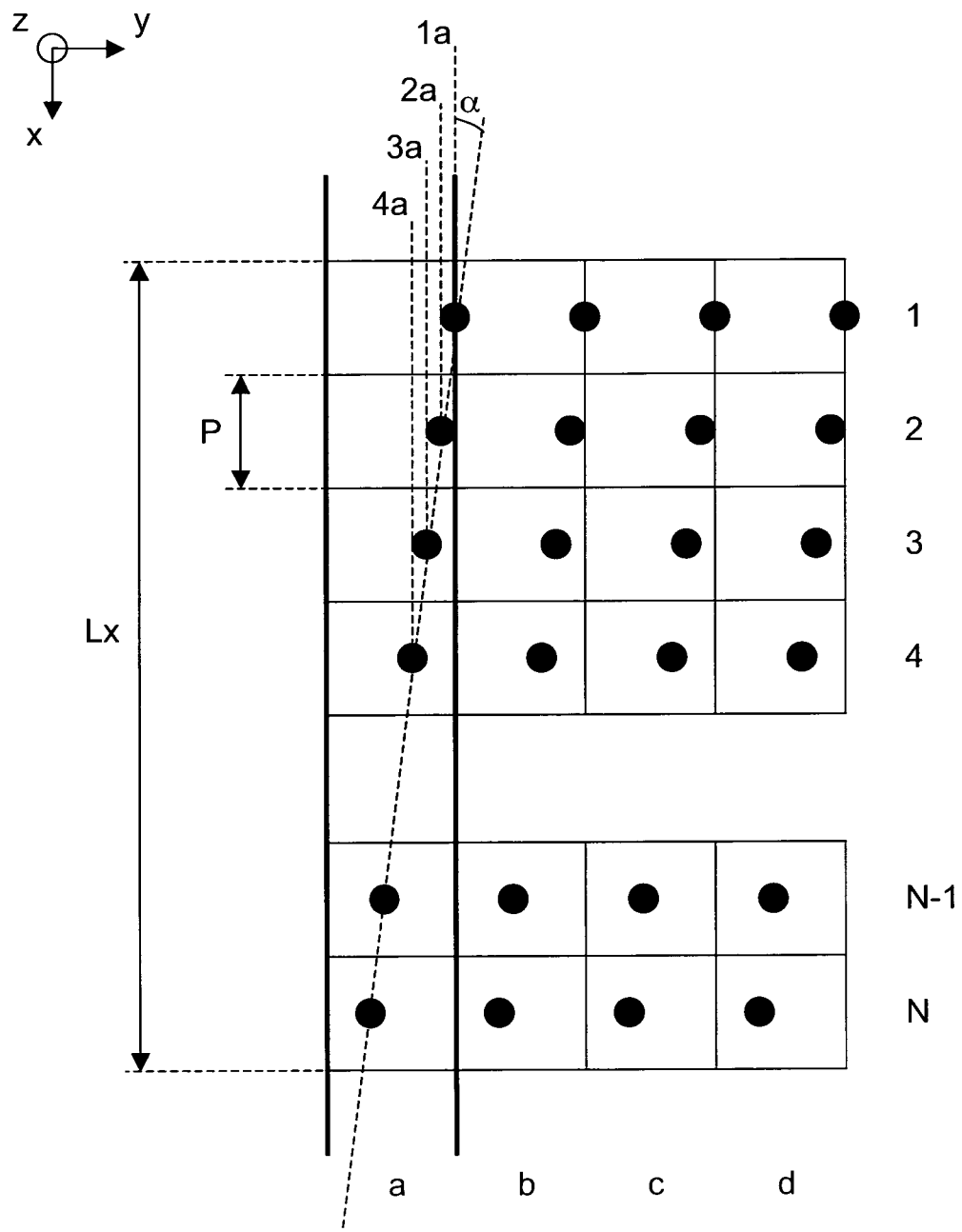
FIG. 8 is a top view of the spectrometer according to the third embodiment in the "evanescent waves" configuration.

FIG. 8 represents a top view of the spectrometer according to the third embodiment in the "evanescent waves" configuration.

FIG. 6 also illustrates the results obtained according to this third embodiment. The diffusers 16 are in this case progressively shifted with regard to the centers of the detectors 19. The shift depends on the tilting angle α. The interference line 13 is parallel to the axis (Ox). The detectors 19 located in column "a" and lines 1 to N provide a sampling of the intensity distribution along this column "a", as illustrated in FIG. 6. The points "1a" to "Na" give the intensity of the interference field 12 to the corresponding points of the array 18, similarly to that obtained by the spectrometer according to the two first embodiments described above. Thus, the same information is obtained at the spectrometer as the one obtained by the configuration according to the two first embodiments.

Figure 9:
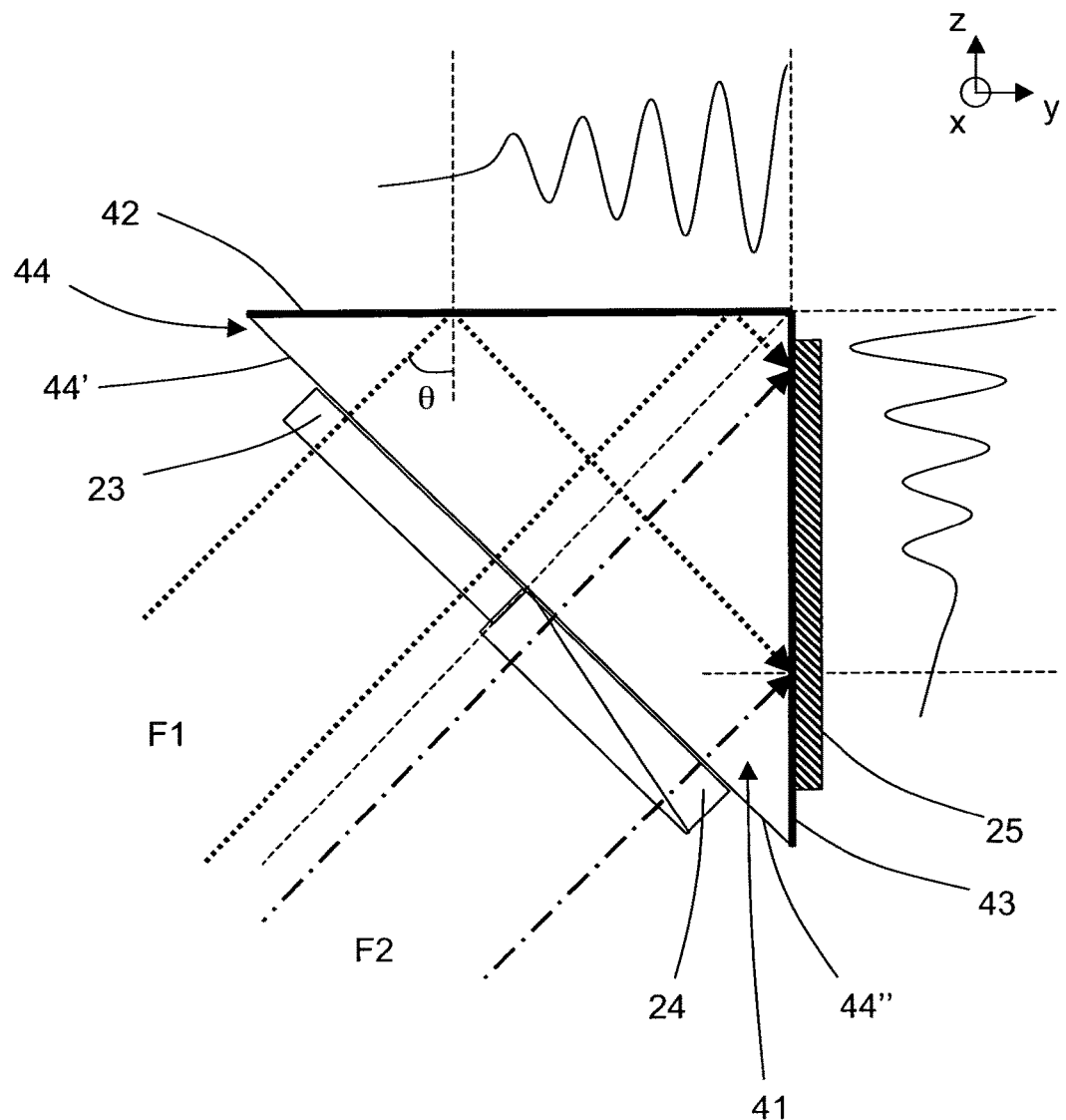
FIG. 9 is a cross-sectional view of the spectrometer illustrating a first configuration for obtaining an interference system by "wavefront separation."
Figure 10:
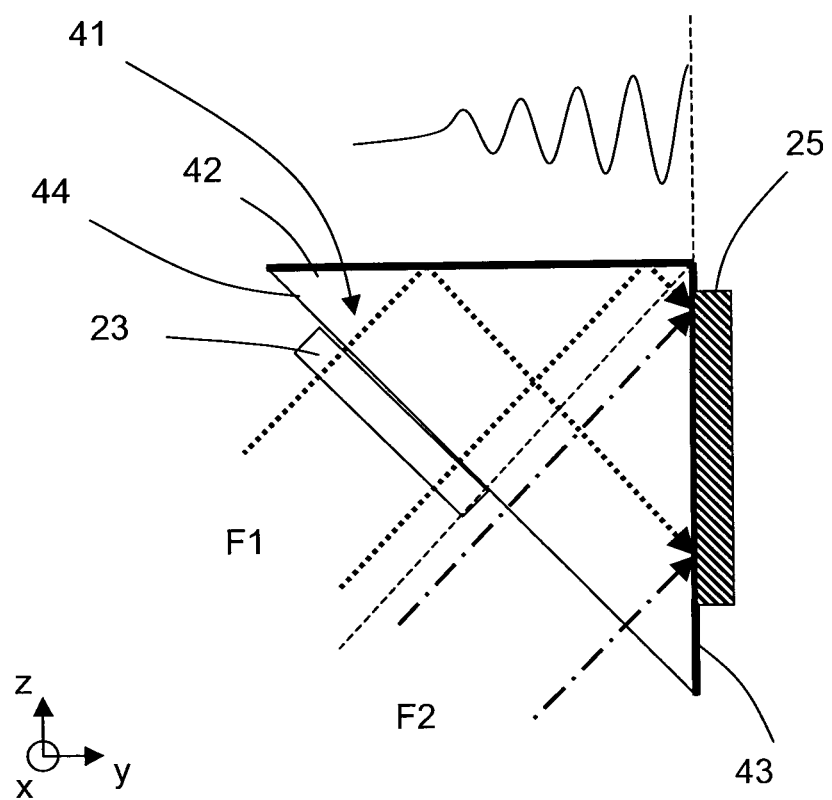
FIG. 10 is a cross-sectional view of the spectrometer illustrating a second configuration for obtaining an interference system by "wavefront separation."
Figure 11:
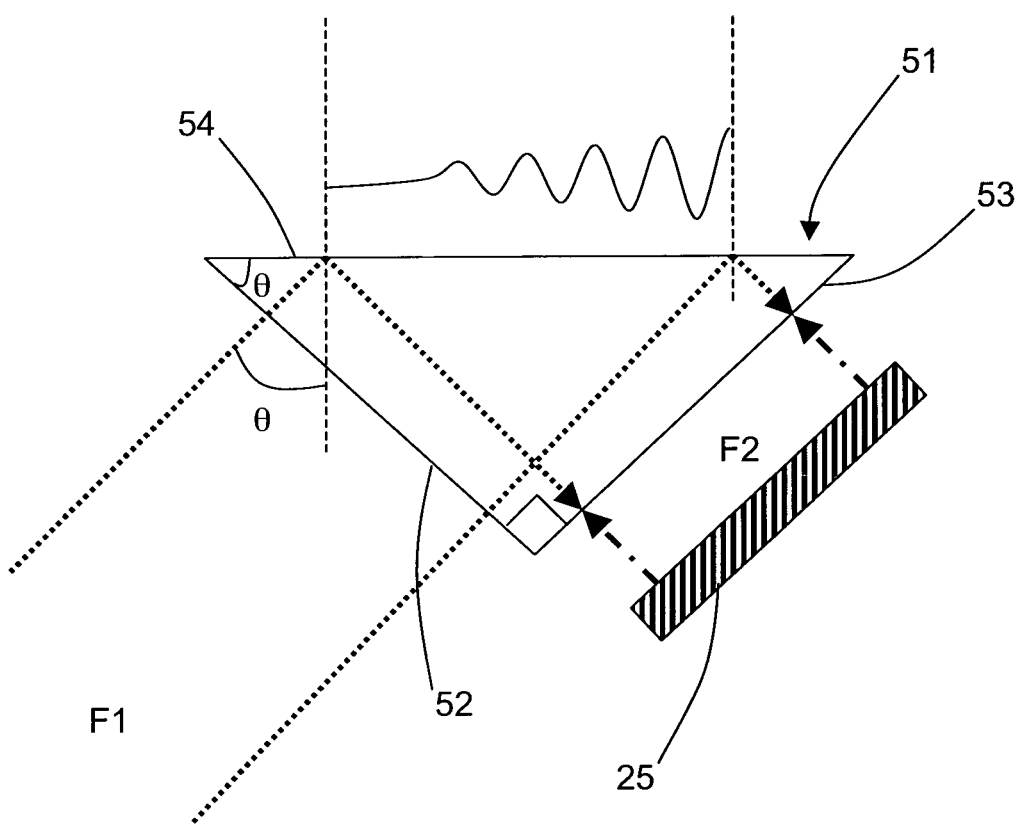
FIG. 11 is a cross-sectional view of the spectrometer illustrating a second configuration for obtaining the interference system by "retroreflection."

FIGS. 9, 10 and 11 represent configurations for spectroscopic detector applications. In each of these configurations, the transduction element producing the spectroscopic function can be arranged only on one prism surface and is only represented as an illustration.

FIG. 9 represents a cross-sectional view of the spectrometer illustrating a first configuration for obtaining an interference system by "separation of wavefront".

The spectrometer contains an isosceles prism 41. This isosceles prism 41 is composed of five faces: a front face (44), two back faces (42, 43), a top face and a bottom face. Said top and bottom faces each constitute an isosceles triangle. It is arranged so as the refracting surface is composed at present of at least one portion of the back faces 42 and 43 of prism 41. In this case, the interference beams F1 and F2 reach the front face 44 of prism 41 in normal incidence symmetrically with regard to the median plane of said front face 44 that cuts the edge formed by the intersection of the two back faces 42 and 43 of said prism 41. Each beam is thus distributed along one of the two sides of the median plane. The angle of the prism determines the angle of incidence of the two beams. In particular, an isosceles rectangular prism corresponds to an angle of incidence of 45°. The structure thus formed with the prism 41 ensures a mechanical and thermal consistency and stability of the spectrometer.

The transduction means 25 is arranged against the back face 43 and realizes the function of spectroscopic detector. In an equivalent manner to that obtained with a spectrometer according to the three first embodiments, we obtain with this configuration an interference field 12 distributed symmetrically between the two back faces (42, 43) of the isosceles prism 41. In fact, with this configuration, the beam F1 traverses the means 23 then the prism 41, before being reflected onto the back face 42 of the prism. Similarly, the beam F2 traverses the means 24 then the prism 41, before being reflected onto the back face 43 of the prism. The interference field is hence formed on the faces 42 and 43. For example the interferences on the face 42 correspond to the interferences between the light beams F1 sent on said face 42 and the beam F2 sent on said face 42 after reflection on face 43.

The mono-dimensional phase lag means 23 is arranged against one of the two front half-faces 44' or 44" of the front face 44 of the prism 41. Each of the two front half-faces 44' and 44" is formed by the intersection of the front face 44 with the median plane of said front face 44 that cuts the edge formed by the intersection of the two back faces 42 and 43 of said prism 41. We will understand later that each front half-face (44', 44") of prism 41 is thus constituted. In this configuration, the means 23 is arranged of the side of the beam F1. It enables delay of the beam F1 so as to shift the central fringe far from the prism apex 41. This enables to minimize the effects of the stray light diffused by apex.

The two-dimensional phase lag means 24 is arranged against the front half-face 44" of the front face 44 of prism 41, the first half-face 44' being already occupied by the phase lag means 23.

FIG. 10 represents a cross-sectional view of the spectrometer illustrating a second configuration for obtaining an interference system by "distribution of wavefront."

The two-dimensional phase lag means 24 is arranged this time against the back face 43 of the isosceles prism 41. This choice of the back face 43 is due to the fact that the phase lag means 23 is arranged against the front half-face 44'. The lower part of the beam F2 undergoes a reflection with a phase shift along the axis (Ox) that depends on means 24. In this case, the means 24 may be a phase lag mirror or a mirror tilted at an angle $\alpha$.

The transduction means 25 is arranged on the back face 43 and acts also like the mono-dimensional 23 or two-dimensional 24 phase lag means. This transducer 25 enables production of the detector applications. By being in contact with the medium to be analyzed, it can induce:
  a phase shift or a modification of the reflection spectrum (activation of surface on electrical mirror whereof the refraction index depends on the external environment),
  a variation of the angle of reflection or absorption (surface plasmons), and
  dicing towards the exterior of the prism (Bragg arrays).

FIG. 11 represents a cross-sectional view of the spectrometer illustrating a second configuration for obtaining the interference system by "retro-reflection."

The spectrometer contains a right angle prism and an element 25 that acts as a mirror. The beam F1 reaches the face 52 and is then reflected on the face 54 in order to reach the element 25 placed against the face 53. The beam F2 reaches directly on the face 53, whereon it is reflected due to the presence of the element 25. Then the interferogram or the standing wave is produced between the faces 53 and 54, which can be trapped and measured by the detection system.

According to another embodiment, said transduction means 25 is merged with two-dimensional phase lag means.

Figure 12:
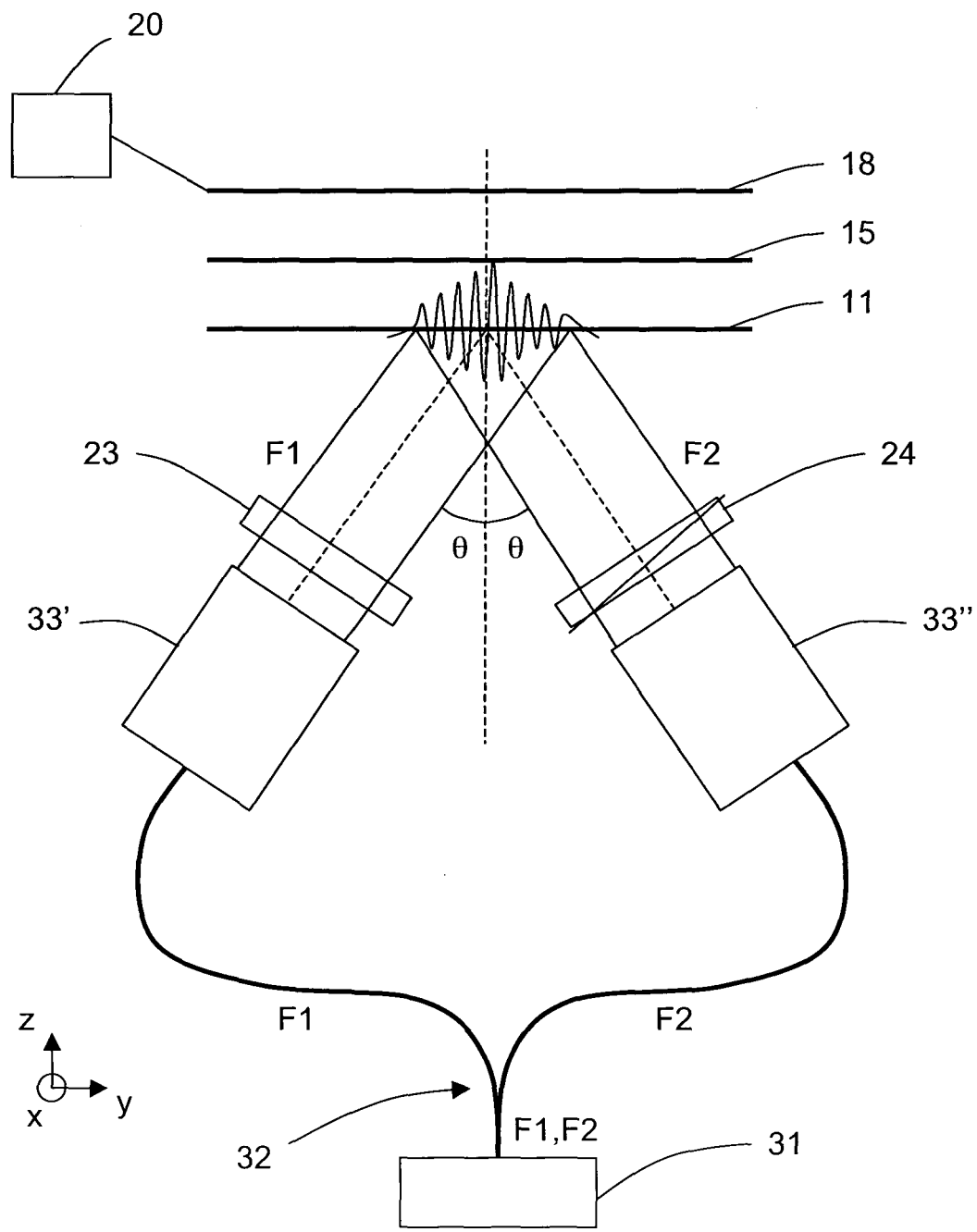
FIG. 12 is a diagram of the spectroscopic imaging device according to an embodiment.

FIG. 12 represents a diagram of the spectroscopic imaging device according to the invention.

This device includes means of emission of two interference beams (F1, F2) and a spectrometer in accordance with embodiments.

The means of emission include a light source 31 emitting a light beam, a separation beam 32 of this light beam into two interference beams F1 et F2 (amplitude separation), as well as means of guiding and collimation (33,33') of said two interference beams towards the refracting surface 11.

The separation means 32 comprises a means of standard optical separation, in particular a means among such as a beamsplitter, a half-wave splitter blade and optical fiber couplers, etc.

With means of guiding and collimation (33, 33'), the two light beams F1 et F2 are collimated so as to localize the interference field 12 on the refracting surface 11. A section interference beam for example rectangular can be obtained by a system of cylindrical microlenses.

The two interference beams F1 and F2 respectively traverse the means of mono-dimensional 23 and two-dimensional 24 phase lag means and are sent towards the refracting surface 11. The refracting surface 11 may be for example at least one of the faces of the prism 41. When the detection is carried out in the air, the angle of incidence $\theta$ is higher than the critical angle $\theta c = Arcsin(1/n)$. More precisely, apart from the refracting surface 11, the shape of the prism 41 can be any of the following: Spherical, three or several faces, etc.

The connection for separating the light beam from the source 31 into two beams F1 and F2 is a bundle connection.

This device contains finally two beams 15 and 18 of elements of diffusion 16 and detection 19, as well as means of calculation 20.

A spectrometer and a spectrometer imaging device in accordance with embodiments can be used for different applications, such as for the following applications:

- a device for visible colorimetric measurement, for example for a spectral band 380-730 nm with a resolution of 10 nm: a sufficient device shows an angle of incidence θ=70°, a pixel size P=12 μm, a tilting angle α=0.16°, a transversal size of beams Lx=4.2 mm and a beam width Lyz=0.01 mm;
- a device for an infrared telecommunication, for example for a spectral band 1400-1600 nm with a resolution of 1 nm: a sufficient device exhibits an incidence angle θ=70°, a pixel size P=12 μm, a tilting angle α=0.6°, transversal size of beams Lx=1.2 mm and a beam width Lyz=0.5 mm;
- a device for an infrared absorption spectroscopy, for example for a spectral band 1500-1600 nm with a resolution of 0.2 nm: a sufficient device shows an incidence angle θ=70°, a pixel size P=12 μm, a tilting angle α=1.27°, transversal size of beams Lx=0.5 mm and a beam width Ly=2.2 mm.

The previously described embodiments of the present invention are given by way of examples and are in no way limitative. It is understood that the skilled person can produce different alternatives of the invention within the framework of the invention.

Particularly, it is possible not to integrate directly the two-dimensional array 18 of detection elements 19 in the spectrometer. In this case, the spectrometer assembly with the two-dimensional array of detection elements—by providing the appropriate tilting—allows to achieve the spectroscopic function within the framework of the invention.

The invention claimed is:

1. A spectrometer comprising:
a refracting surface; and
a capturing means at the refracting surface of an interferogram delivered from two interference beams and forming interference lines parallel to each other along a transverse axis of a plane of the refracting surface, the capturing means including an array of detection elements parallel to the plane of the refracting surface and arranged to detect a spatial distribution of the interferogram;
wherein the array is a two-dimensional array over an entirety of which the detection elements are disposed equidistantly,
and wherein interference lines exhibit an angular shift with the capturing means, the spectrometer further comprising
an isosceles prism having a front face and two back faces, arranged so as the refracting surface comprises at least a portion of the back faces of the prism, such that the interference beams arrive at a front face of the prism in normal incidence symmetrically with respect to a median plane of the front face which crosses an edge formed by an intersection of both back faces of the prism.

2. The spectrometer according to claim 1, comprising:
at least a two-dimensional phase lag arranged to delay the phase of one of the two interference beams and/or at least a mono-dimensional phase lag arranged so as to delay the phase of one of the two beams of interference so as to move the position of a center of the interferogram along a transverse axis of the interferogram.

3. The spectrometer according to claim 1, wherein an incidence angle of each of the two interference beams on the plane of the refracting surface is smaller than a total reflection critical angle.

4. The spectrometer according to claim 3, comprising:
an index gel disposed between the two-dimensional array of detection elements and the refracting surface, and in contact with the array and the refracting surface so as to reduce multiple reflections between the array and the refracting surface.

5. The spectrometer according to claim 2, wherein at least one mono-dimensional phase lag is disposed against one of two front half-faces of the front face of the isosceles prism, each front half-face being formed by an intersection of the front face with a median plane of the front face that cuts the edge formed by the intersection of both back faces of the prism.

6. The spectrometer according to claim 5, wherein at least one two-dimensional phase lag is disposed against one of the two front half-faces of the front face of the isosceles prism.

7. The spectrometer according to claim 2, wherein at least one two-dimensional phase lag is disposed against one of the two back faces of the isosceles prism.

8. The spectrometer according to claim 2, wherein:
the detection elements are transducer elements arranged so that an interference beam arriving on the transducer elements located against the refracting surface in normal incidence after traversing the other back face is then reflected on the front face, and so that the other interference beam directly arrives on the refracting surface, on which the other interference beam is reflected due to a presence of the transducer elements.

9. The spectrometer according to claim 1, wherein the capturing means further comprises a two-dimensional array of diffusion elements parallel to the plane of the refracting surface disposed equidistantly on the entirety of the two-dimensional array and arranged to project the interferogram on the two-dimensional array of detection elements through propagative wave diffusion.

10. The spectrometer according to claim 9, further comprising:
at least a two-dimensional phase lag arranged to delay the phase of one of the two interference beams and/or at least a mono-dimensional phase lag arranged so as to delay the phase of one of the two beams of interference so as to move the position of a center of the interferogram along a transverse axis of the interferogram.

11. The spectrometer according to claim 9, wherein an incidence angle of each of the interference beams on the plane of the refracting surface is greater than a total reflection critical angle.

12. The spectrometer according to claim 9, wherein each detection element is superimposed to a diffusion element by projection along an orthogonal axis to the plane of the refracting surface.

13. The spectrometer according to claim 9, wherein a width of at least a portion of the diffusion elements is smaller than a quarter of an interfringe of the interferogram.

14. The spectrometer according to claim 9, wherein at least one diffusion element is a bar, a length of which is equal to a length of a detection element.

15. The spectrometer according to claim 9, wherein at least one diffusion element is a diffusing stud or a diffusing point.

16. The spectrometer according to claim 10, wherein at least one mono-dimensional phase lag is disposed against one of two front half-faces of the front face of the isosceles prism, each front half-face being formed by an intersection of the front face with a median plane of the front face that cuts the edge formed by the intersection of both back faces of the prism.

17. The spectrometer according to claim 16, wherein at least one two-dimensional phase lag is disposed against one of the two front half-faces of the front face of the isosceles prism.

18. The spectrometer according to claim 10, wherein at least one two-dimensional phase lag is disposed against one of the two back faces of the isosceles prism.

19. The spectrometer according to claim 9, further wherein:
the detection elements are transducer elements arranged so that an interference beam arriving on the transducer elements located against the refracting surface in normal incidence after traversing the other back face is then reflected on the front face, and so that the other interference beam directly arrives on the refracting surface, on which the other interference beam is reflected due to a presence of the transducer elements.

20. A spectrometer comprising:
a refracting surface; and
a capturing means at the refracting surface of an interferogram delivered from two interference beams and forming interference lines parallel to each other along a transverse axis of a plane of the refracting surface, and wherein the incidence angle of each of said interference beams on the plane (xOy) of the refracting surface is greater than the total reflection critical angle, the capturing means including an array of detection elements parallel to the plane of the refracting surface and arranged to detect a spatial distribution of the interferogram, wherein the array of detection elements is a two-dimensional array over an entirety of which the detection elements are disposed equidistantly;
the capturing means further including a two-dimensional network of scattering elements arranged to sample the interferogram on the two-dimensional network of detection elements by scattering of evanescent waves;
and wherein interference lines exhibit an angular shift with the capturing means.

21. The spectrometer according to claim 20, comprising:
at least a two-dimensional phase lag arranged to delay the phase of one of the two interference beams and/or at least a mono-dimensional phase lag arranged so as to delay the phase of one of the two beams of interference so as to move the position of a center of the interferogram along a transverse axis of the interferogram.

22. The spectrometer according to claim 20, wherein the two-dimensional network of detection elements is parallel to the two-dimensional network of scattering elements.

23. The spectrometer according to claim 20, wherein each detection element is superimposed to a scattering element by projection along the orthogonal axis (Oz) to the plane (xOy) of the refracting surface.

24. The spectrometer according to claim 20, wherein each detection element is superimposed to a scattering element by projection along the orthogonal axis (Oz) to the plane (xOy) of the refracting surface.

25. The spectrometer according to claim 20, wherein at least a scattering element is a bar the length of which is equal to the length of a detection element.

26. The spectrometer according to claim 20, wherein at least a scattering element is a diffusing stud.

27. The spectrometer according to claim 20, wherein at least a scattering element is a diffusing point.

* * * * *